(12) United States Patent
Pulphus et al.

(10) Patent No.: US 9,032,600 B2
(45) Date of Patent: May 19, 2015

(54) BRAKE DRUM AND WHEEL MOUNTING TOOL

(75) Inventors: Art Pulphus, University Heights, OH (US); Grant DeGeorge, Strongsville, OH (US); Will Waiwood, Cleveland, OH (US); Matthew Brest, Hudson, OH (US)

(73) Assignee: Alcoa Inc., Pittsburgh, PA (US)

( * ) Notice: Subject to any disclaimer, the term of this patent is extended or adjusted under 35 U.S.C. 154(b) by 379 days.

(21) Appl. No.: 12/618,310

(22) Filed: Nov. 13, 2009

(65) Prior Publication Data

US 2011/0113608 A1    May 19, 2011

(51) Int. Cl.
*B25B 27/14* (2006.01)
*B60B 11/00* (2006.01)
*F16D 65/00* (2006.01)
*F16D 65/10* (2006.01)

(52) U.S. Cl.
CPC ........... *B60B 11/00* (2013.01); *Y10T 29/53922* (2015.01); *F16D 65/0043* (2013.01); *F16D 65/10* (2013.01)

(58) Field of Classification Search
USPC ........... 29/244, 246, 255, 263, 271, 273, 275, 29/280; 301/35.632, 35.621, 35.626, 301/35.627; 188/17, 74, 205 R, 206 R, 188/218 R, 218 XL
See application file for complete search history.

(56) References Cited

U.S. PATENT DOCUMENTS

| | | | |
|---|---|---|---|
| 2,708,712 A | 5/1955 | Jamieson | |
| 4,097,979 A * | 7/1978 | Interdonato | 29/273 |
| 4,625,385 A | 12/1986 | Kohler et al. | |
| 4,646,594 A | 3/1987 | Tien | |
| 4,708,397 A | 11/1987 | Weinmann | |
| 4,949,448 A | 8/1990 | Hebnes | |
| 4,969,245 A | 11/1990 | Gevas | |
| 5,022,133 A | 6/1991 | Weitekamp | |
| 5,209,623 A | 5/1993 | Krehnovi | |
| 5,890,567 A * | 4/1999 | Pete et al. | 188/218 R |
| 5,897,171 A | 4/1999 | Seifert | |
| 5,906,418 A * | 5/1999 | Cullen | 301/36.1 |
| 6,068,344 A | 5/2000 | Nether | |

(Continued)

FOREIGN PATENT DOCUMENTS

| FR | 2547247 | 12/1984 |
|---|---|---|
| GB | 430765 | 6/1935 |

(Continued)

OTHER PUBLICATIONS

Japanese Office Action (w/translation) dated Nov. 19, 2014, issued by the Japanese Patent Office in Japanese Patent Application No. 2010-251529 (6 pages).

*Primary Examiner* — Lee D Wilson
*Assistant Examiner* — Nirvana Deonauth
(74) *Attorney, Agent, or Firm* — Greenberg Traurig, LLP (57) ABSTRACT

The present disclosure relates to systems, methods, and apparatus for the installation of wheels. In one embodiment, a brake drum and wheel mounting tool assists in the mounting of wheels and brake drums onto wheel hubs. The brake drum and wheel mounting tool comprises an elongated body and a threaded bore. The elongated body is dimensioned to be received through a stud hole of a wheel. The elongated body has first end and a second end. The first end of the body is dimensioned to apply pressure to a brake drum when the body is threaded on a wheel stud. The second end of the body is tapered and dimensioned to accept a socket.

6 Claims, 9 Drawing Sheets

(56) References Cited

U.S. PATENT DOCUMENTS

| | | | | |
|---|---|---|---|---|
| 6,070,946 | A * | 6/2000 | Holmes | 301/36.1 |
| 6,312,058 | B1 | 11/2001 | Lupyrypa | |
| 6,626,502 | B1 | 9/2003 | Petrak | |
| 6,715,843 | B2 | 4/2004 | Teague | |
| 7,111,909 | B2 * | 9/2006 | Andersen | 301/35.627 |
| 7,178,880 | B2 | 2/2007 | Andersen | |

FOREIGN PATENT DOCUMENTS

| | | |
|---|---|---|
| GB | 544510 | 4/1942 |
| GB | 723297 | 2/1995 |
| JP | 2002-144803 | 5/2002 |

* cited by examiner

Prior Art

BRAKE DRUM AND WHEEL MOUNTING TOOL

BACKGROUND

During the mounting of wheels, the alignment between the hub bore and the bolt holes can rotate making the use of nuts and sleeved cap nuts difficult to align within the bolt holes. The operator must rotate the wheel assembly to align bolt holes while maintaining its position on the center hub bolts. A brake drum is mounted to a wheel hub on the wheel hub mounting tabs, which are typically very short. As the wheels are assembled over the brake drum, the assembly process can cause the brake drum to slide from the wheel hub mounting tabs causing a non-flush connection to the wheel hub itself. When the brake drum is non-flush with the wheel hub, the nuts used to attach the wheels to the wheel hub may not be sufficiently threaded onto the wheel studs to securely attach the wheels to the wheel hub and prevent the wheels from falling off the vehicle during operation.

SUMMARY OF THE DISCLOSURE

Broadly, the present disclosure relates to systems, methods, and apparatus for the installation of wheels and brake drums. In one aspect, a brake drum and wheel mounting tool assists in the mounting of wheels and brake drums onto wheel hubs. The brake drum and wheel mounting tool comprises an elongated body and a threaded bore. The elongated body may be dimensioned to be received through a stud hole of a wheel. The elongated body may have a first end and a second end. The threaded bore may be dimensioned to accept a wheel stud and may extend axially through the first end of the elongated body. The first end of the body may be dimensioned to apply pressure to a brake drum when the body is threaded on a wheel stud.

In one embodiment, the brake drum and wheel mounting tool is sufficiently long to accept two wheels when the body is threaded on a wheel stud. In one embodiment, the threaded bore is partially threaded. In one embodiment, the threaded bore may extend through the second end of the elongated body. In one embodiment, the second end of the elongated body is tapered. For example, the second end of the elongated body becomes gradually narrowed relative to the first end of the elongated body. In one embodiment, the second end of the elongated body is dimensioned to accept a socket. For example, a standard socket can be applied to the second end of the elongated body allowing for faster and easier assembly of the brake drum and wheel mounting tool. In one embodiment, the first end of the body is blunt. For example, the first end of the body may have a broad or rounded end.

Various ones of the inventive aspects noted hereinabove may be combined to yield various, systems, methods, and/or apparatus for the installation of wheels and brake drums. These and other aspects, advantages, and novel features of the invention are set forth in part in the description that follows and will become apparent to those skilled in the art upon examination of the following description and figures, or may be learned by practicing the invention.

DETAILED DESCRIPTION

Reference will now be made in detail to the accompanying drawings, which at least assist in illustrating various pertinent embodiments of the present invention.

The instant disclosure relates to a brake drum and wheel mounting tool configured to assist in the mounting of wheels onto wheel hubs, (e.g., a wheel assembly). In particular, the brake drum and wheel mounting tool may assist in mounting the brake drum to the wheel hub (e.g., holding the brake drum in place, against the wheel hub, while the wheels are being mounted).

Figure 1:
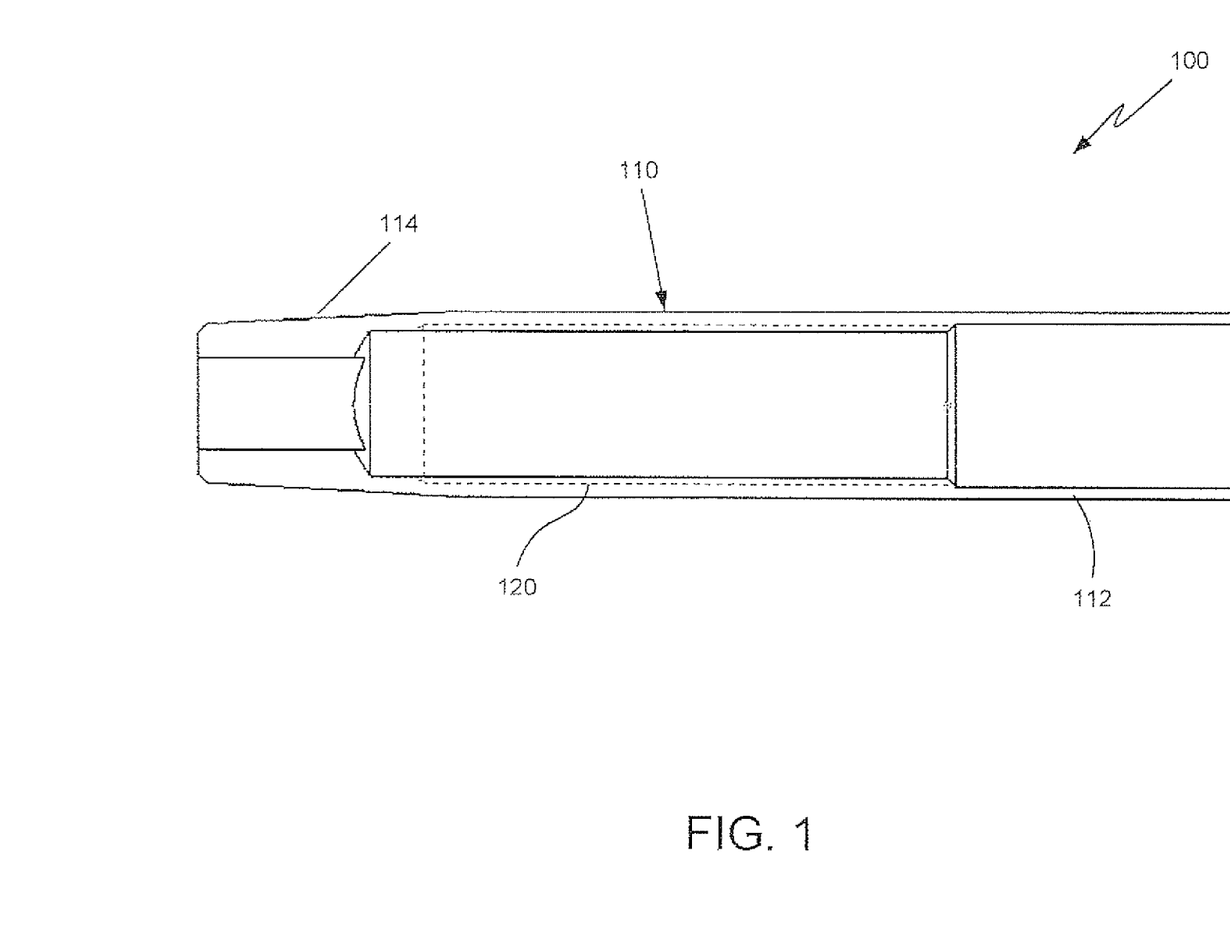
FIG. 1 is a cross-sectional view of one embodiment of a brake drum and wheel mounting tool in accordance with the present invention.
Figure 2:
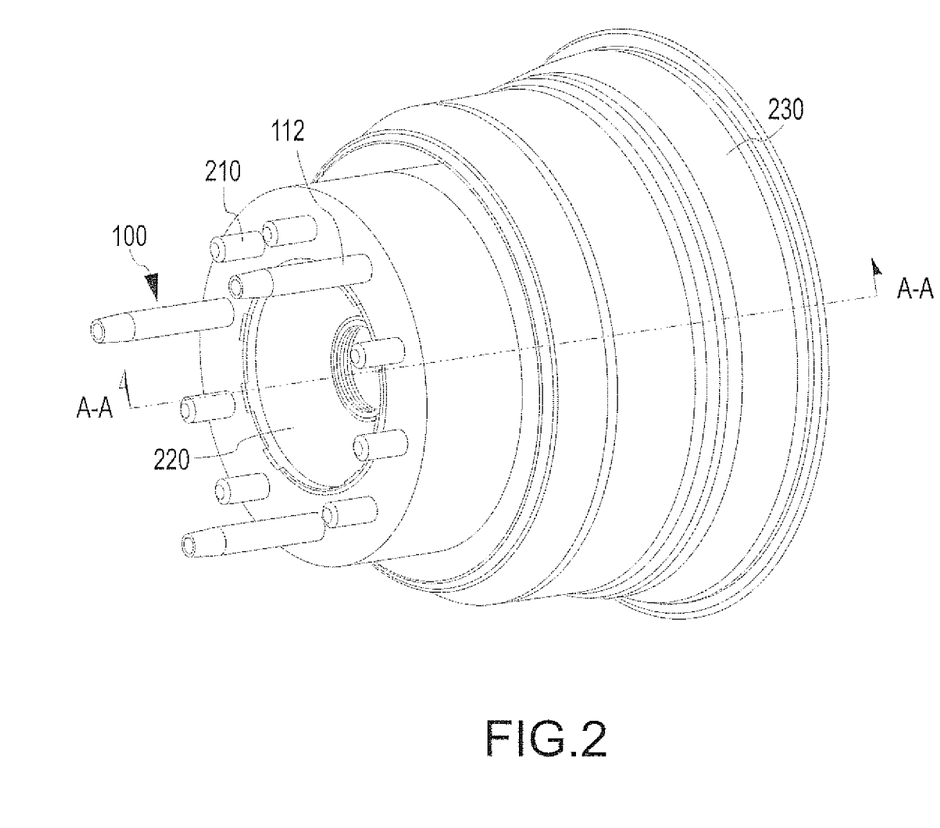
FIG. 2 is a perspective view of three of the brake drum and wheel mounting tools of FIG. 1 properly seating a brake drum before wheels are installed.

In one embodiment, and with reference now to FIG. 1, the brake drum and wheel mounting tool 100 includes an elongated body 110 dimensioned to be received through a stud hole of a wheel. The elongated body 110 has a first end 112 and a second end 114. A threaded bore 120, dimensioned to accept a wheel stud extends axially through the first end 112 of the elongated body 110. The first end 112 of the elongated body 110 is dimensioned to apply pressure to a brake drum when the elongated body 110 is threaded onto a wheel stud.

In one embodiment, the brake drum and wheel mounting tool 100 may be any length suitable to enable the desired number of wheels to be mounted on a wheel hub and to apply pressure to a brake drum. In one embodiment, the wheel mounting tool 100 may be sufficiently long to accept two wheels when the elongated body 110 is threaded onto a wheel stud. In other embodiments, the brake drum and wheel mounting tool 100 may be sufficiently long to accept at least three wheels when the elongated body 110 is threaded onto a wheel stud.

In one embodiment, the threaded bore 120 may be partially threaded. In one embodiment, the threaded bore 120 may be completely threaded. The threaded bore 120 may extend through the second end 114 of the elongated body 110. The threaded bore 120 may be any diameter suitable to enable the brake drum and wheel mounting tool 100 to be threaded onto a wheel stud. In one embodiment, the first end 112 of the elongated body 110 may be any shape and/or length suitable to enable the application of pressure to a brake drum when the elongated body 110 is threaded onto a wheel stud. For example, the first end 112 of the elongated body 110 may be substantially blunt, rounded, curved, and/or hemispherical. In one embodiment, the second end 114 of the elongated body 110 may be tapered and dimensioned to accept a socket. In one embodiment, the second end 114 of the elongated body 110 may be straight relative to the first end 112 of the elongated body 110.

The brake drum and wheel mounting tool 100 is applied prior to the installation of the wheels. For example, and with reference now to FIGS. 2, 3A, 3B, and 4 the brake drum and wheel mounting tool 100 holds a brake drum 230 flush with a wheel hub mounting face 310 before the wheels are installed.

Figure 3A:
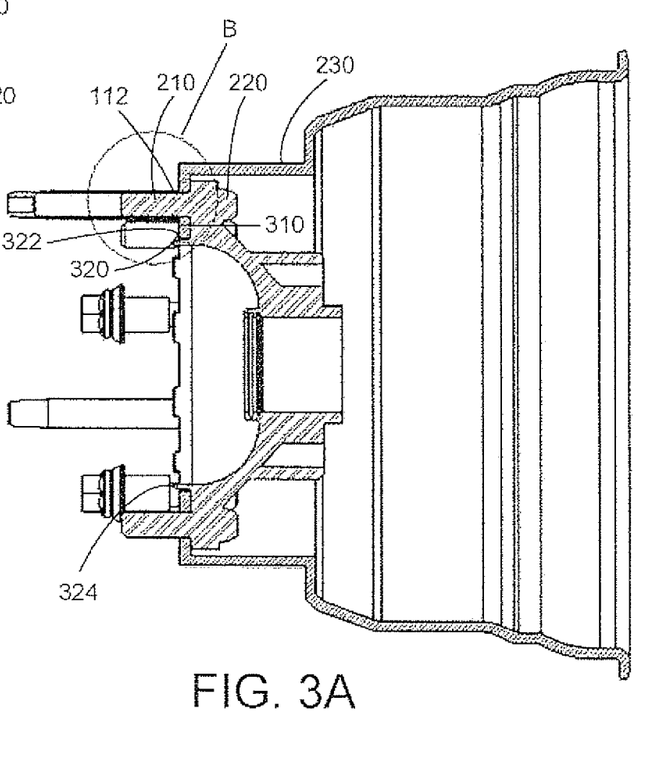
FIG. 3A is a cross-sectional view of the three brake drum and wheel mounting tools along line A-A of FIG. 2.
Figure 3B:
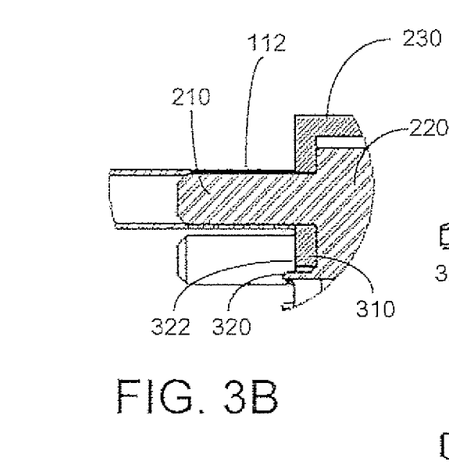
FIG. 3B is an enlarged view of area B of FIG. 3A.
Figure 4:
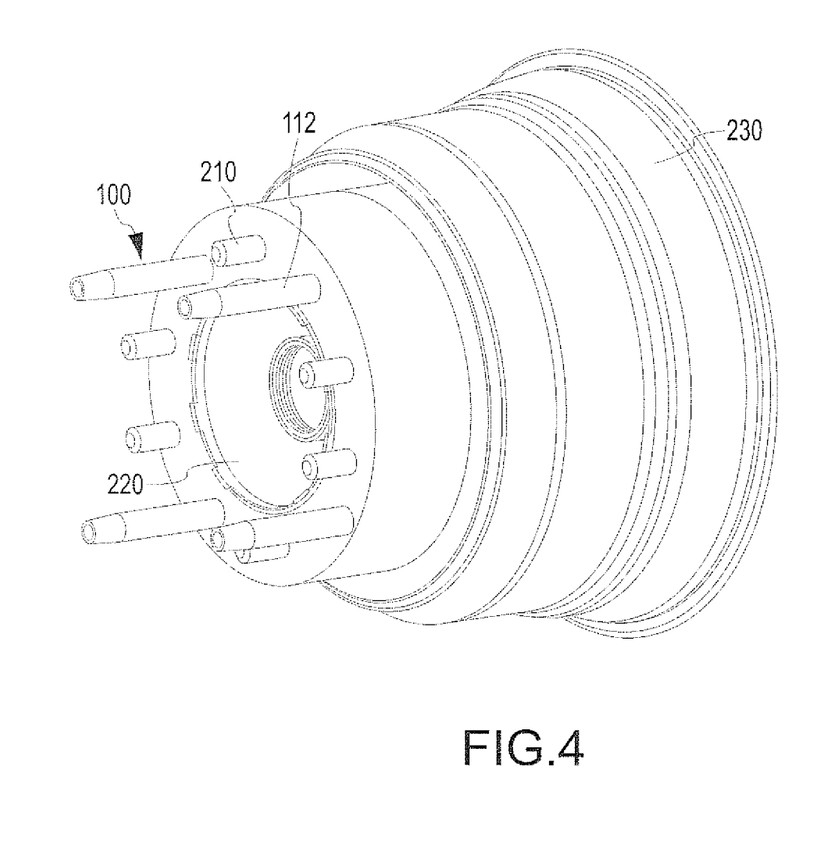
FIG. 4 is a perspective view of four of the brake drum and wheel mounting tools of FIG. 1 properly seating a brake drum before wheels are installed.

First, the brake drum 230 is properly seated against a wheel hub 220. Then, three or four brake drum and wheel mounting tools 100 are threaded onto the wheel studs 210. More than three or four brake drum and wheel mounting tools 100 may be used. The wheel hub 220 has a slot with a mounting tab 320 to facilitate proper seating of the brake drum 230. A space 322 is created between the brake drum 230 and the wheel hub 220. When the brake drum 230 is properly seated in the mounting tab 320, as shown in FIGS. 3A and 3B, the space 322 is uniform with the space 324 on the opposite side of the brake drum 230 and the wheel hub 220. The first end 112 of the brake drum and wheel mounting tool 100 applies pressure to the brake drum 230 to hold the brake drum 230 in place against the wheel hub 220, such that the brake drum 230 remains properly seated in its mounting tabs 320 while a wheel or multiple wheels are being installed on the wheel hub 220. This applied pressure prevents the brake drum 230 from sliding from its mounting tabs 320 causing a non-flush connection to the wheel hub 220 and improper alignment.

Figure 5:
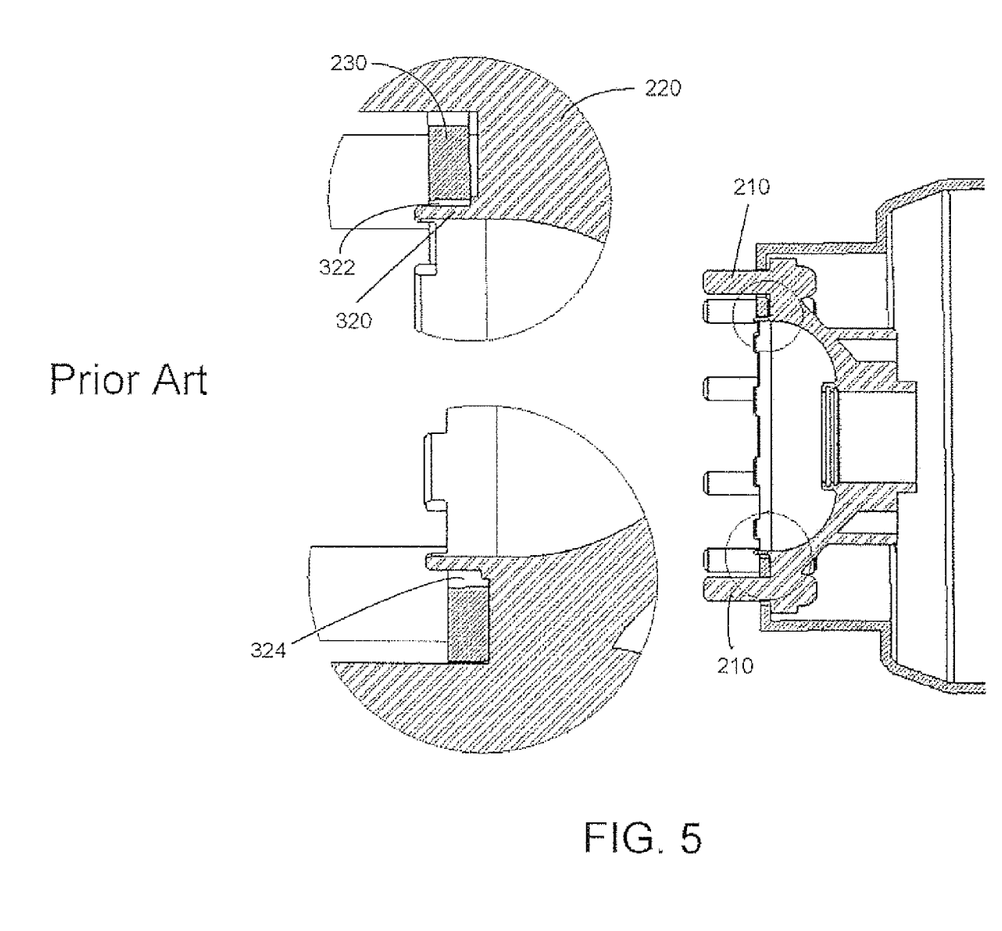
FIG. 5 is a cross-sectional view of a brake drum improperly installed on a wheel hub according to the prior art.

In contrast, FIG. 5 shows improper seating of the brake drum 230. In the illustrated embodiment, a brake drum and wheel mounting tool 100 is not being used. When a brake drum and wheel mounting tool 100 is not used, the brake drum 230 may slip from the mounting tab 320, as shown in the illustrated embodiment, while a wheel and/or multiple wheels are being installed on the wheel hub 220, causing the brake drum 230 and/or wheel (s) to have a non-flush connection to the wheel hub 220 and improper alignment of the brake drum 230 to the wheel hub 220. The space 322 is no longer uniform with the space 324 on the opposite side of the brake drum 230 and the wheel hub 220. When the brake drum 230 is not properly seated in the mounting tab 320, the bolts used to attach the wheels to the wheel hub 220 may not be sufficiently threaded onto the wheel studs 210 to securely attach the wheels to the wheel hub 220 and prevent the wheels from falling off vehicles during operation.

As noted above, the brake drum and wheel mounting tool 100 is applied prior to the installation of a wheel or multiple wheels. In one embodiment, a brake drum and wheel mounting tool 100 is threaded onto a wheel stud 210 after the brake drum 230 is properly seated on the mounting tab 320 of the wheel hub 220. In one embodiment, two brake drum and wheel mounting tools 100 may be threaded onto two wheel studs 210 of a single wheel hub 220. In one embodiment, three brake drum and wheel mounting tools 100 may be threaded onto three wheel studs 210 of a single wheel hub 220. In other embodiments, at least four brake drum and wheel mounting tools 100 may be threaded onto at least four wheel studs 210 of a single wheel hub 220. The first end 112 of the brake drum and wheel mounting tool 100 and/or multiple brake drum and wheel mounting tools 100 provides sufficient contact pressure between the brake drum 230 and the wheel hub 220 to hold the brake drum 230 in place, against the wheel hub 220, such that the brake drum 230 remains properly seated in the mounting tabs 320 while a wheel and/or multiple wheels are being installed on the wheel hub 220.

Figure 6:
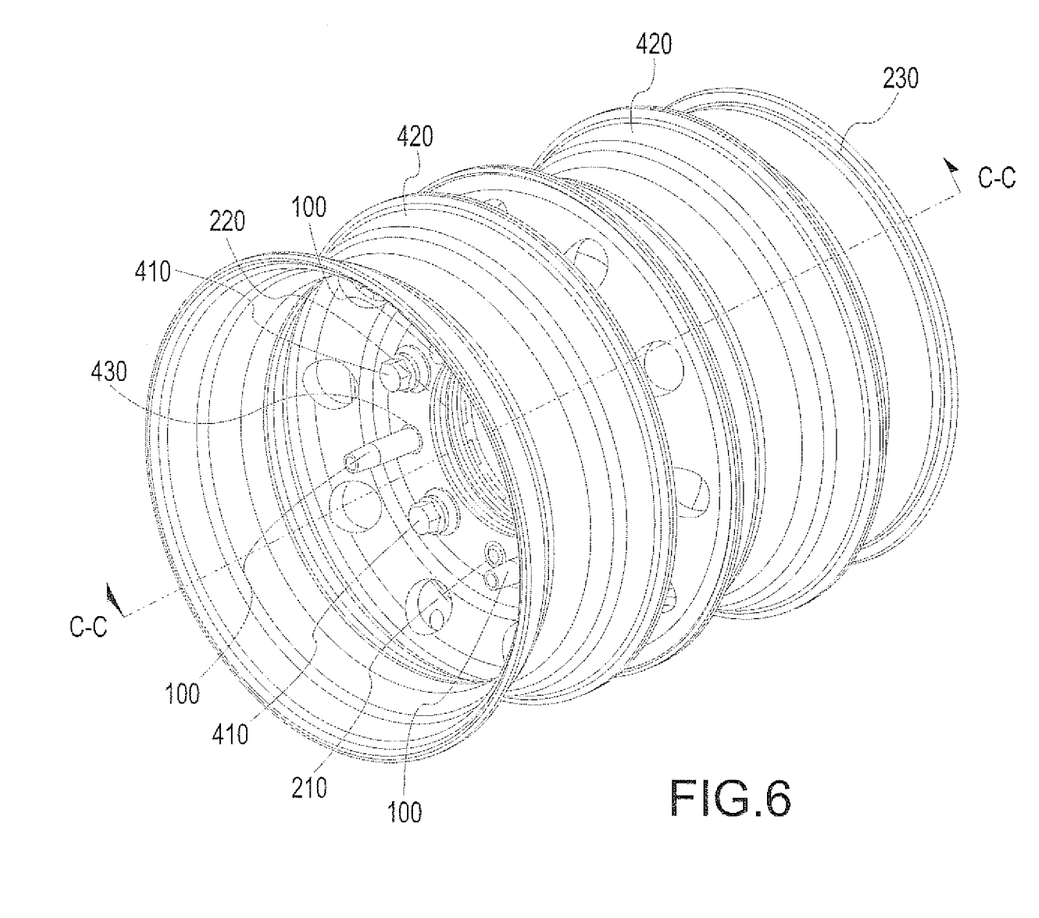
FIG. 6 is a perspective view of wheels mounted onto a wheel hub via the use of the brake drum and wheel mounting tools of FIG. 2.

The brake drum 230 is not securely fastened to the wheel hub 220 until a wheel and/or multiple wheels are placed onto the wheel studs 210 and/or over the brake drum and wheel mounting tools 100 and secured with bolts. For example, and with reference now to FIG. 6, two wheels 420 are placed on the wheel hub 220 by positioning stud holes 430 of the wheels 420 over the wheel studs 210 and/or over the brake drum and wheel mounting tools 100 threaded onto the wheel studs 210 and by sliding the wheels 420 onto the wheels studs 210 against the brake drum 230. Once the wheels 420 are properly mounted, at least two bolts 410 and/or nuts 410 are applied (e.g., threaded onto the wheel studs 210) to secure the wheels 420 to the wheel hub 220. The brake drum and wheel mounting tools 100 are removed (e.g., untorqued and/or unthreaded) from the wheel studs 210 and bolts 410 and/or nuts 410 are applied to the remaining wheel studs 210 (not illustrated).

Figure 7:
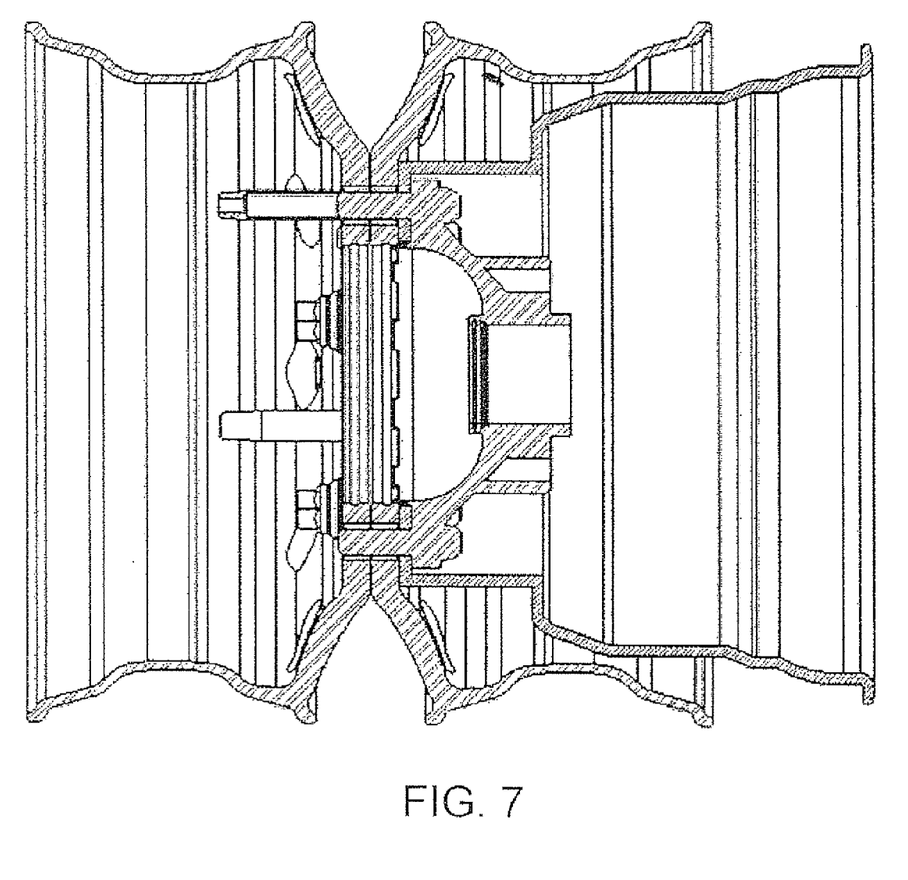
FIG. 7 is a cross-sectional view of one embodiment of FIG. 6 along line C-C.

FIG. 7 illustrates a wheel hub 220 with a properly seated brake drum 230 and two wheels 420 properly mounted onto the wheel hub 220 via the brake drum and wheel mounting tool 100 threaded onto the wheel stud 210. Through the use of the brake drum and wheel mounting tools 100, the position of the brake drum 230 is secured during the wheel mounting process, which enables the bolts 410 and/or nuts 410 to more securely attach the wheel and/or multiple wheels to the wheel hub 220 than if the brake drum 230 slips from the mounting tab 320 during the wheel mounting process. The more secure the wheels and/or multiple wheels are attached to the wheel hub 220, the less frequent wheels will fall off vehicles during operation.

Figure 8:
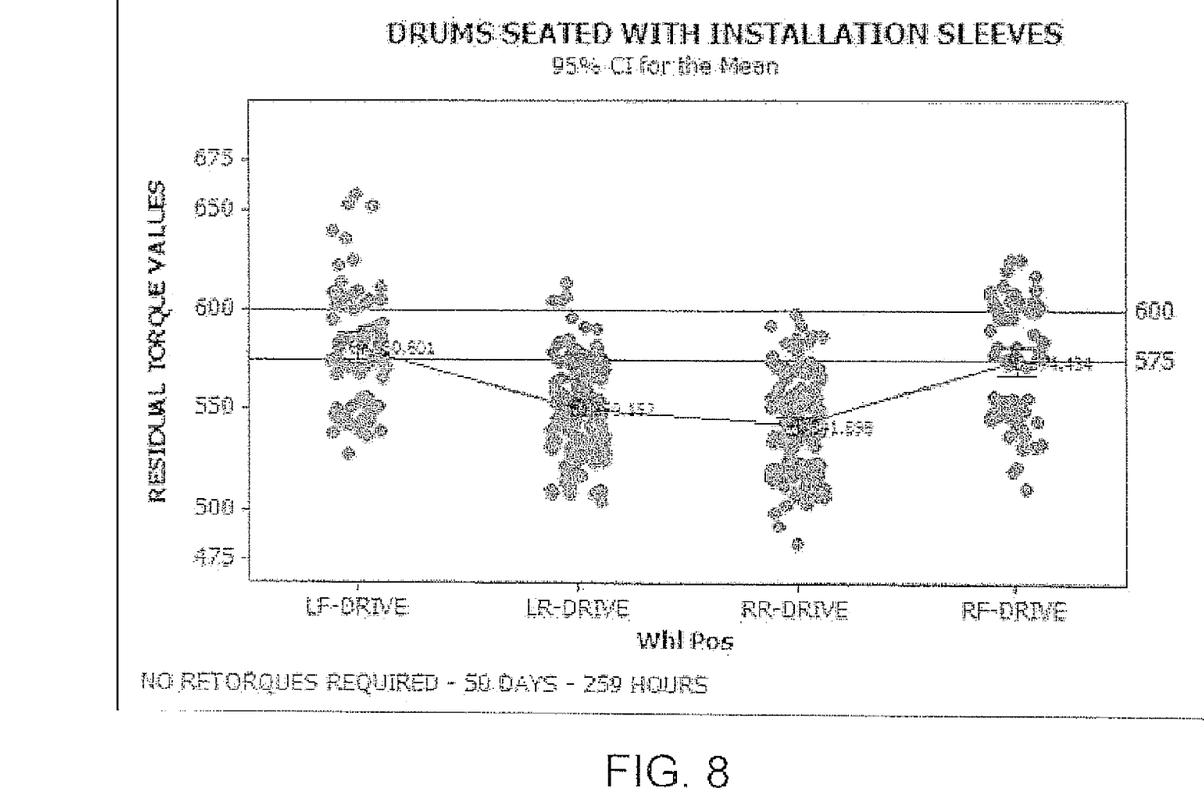
FIG. 8 is a graph containing testing data associated with brake drums properly seated with brake drum and wheel mounting tools.

FIG. 8 illustrates the torque of the nuts when the brake drums are properly seated and the wheels installed with the brake drum and wheel mounting tools shown in FIGS. 1-4, 6, and 7. A truck was driven for a period of 50 days and a total of 259 hours. Each wheel is represented in the data including the left front drive, left rear drive, right rear drive, and right front drive. Each wheel has 500 data points, each data point representing one nut. There are 10 nuts per wheel and the torque of each nut is measured every day resulting in 500 data points. The torque is measured using a standard torque wrench containing an indicator that shows how much torque is applied and/or the measured torque values. The nuts were initially torqued to 600 ft-lbs. The measured torque values of each nut for each wheel were in the range from about 475 ft-lb to about 650 ft-lb. The nuts were not tightened (re-torqued) on the truck over the 50 day period.

Figure 9:
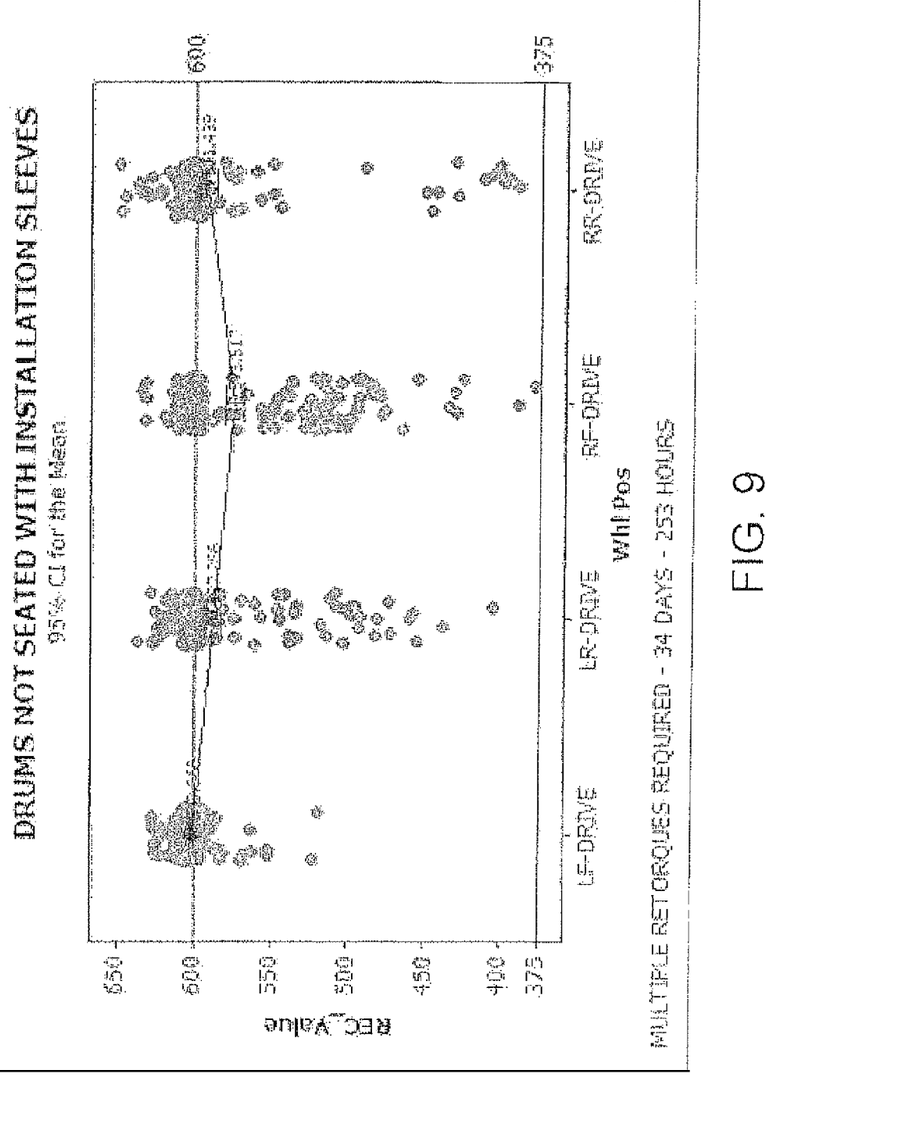
FIG. 9 is a graph containing testing data associated with brake drums seated without brake drum and wheel mounting tools.

FIG. 9 illustrates the torque of the nuts when brake drums were seated without the brake drum and wheel mounting tools. A truck was driven for a period of 34 days and a total of 253 hours. Each wheel is represented in the data including the left front drive, left rear drive, right rear drive, and right front drive. Each wheel has 340 data points, each data point representing one nut. There are 10 nuts per wheel and the torque of each nut is measured every day resulting in 340 data points. The nuts were initially torqued to 600 ft-lbs. The measured torque values of each nut for each wheel were in the range of about 375 ft-lb to about 650 ft-lb. Re-torque to 600 ft-lb was performed on the truck approximately 25 times over the 34 day period.

The industry standard bolt for Class 8 heavy duty trucks is the M22x1.5 bolt throughout North America and Europe and the correct torque level for this bolt is 450-500 ft-lb, as defined in TMC Users' Guide to Wheels and Rims (2003), Table 1, page 24. When the brake drum and wheel mounting tool is used to seat the brake drums, the torque values of the nuts never fall below the minimum correct torque level of 450 ft-lb. Additionally, the variability of the torque values of the nuts decrease when the brake drum and wheel mounting tool is used. When the brake drum and wheel mounting tool is not used to seat the brake drums, a number of torque values of the nuts fall below the minimum correct torque level of 450 ft-lb and regularly require tightening (re-torquing). Thus, using the brake drum and wheel mounting tool decreases variability of torque values and prevents nuts from falling below the minimum specified torque level. Under-torque results in loose wheels which can damage wheels, studs and hubs and can result in wheel loss.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method, comprising the steps of:
   mounting a brake drum to a wheel hub having at least one mounting tab;
   seating the brake drum in the at least one mounting tab of the wheel hub;
   installing at least two mounting tools on at least two studs of the wheel hub; applying pressure directly to the actual brake drum against the wheel hub with the at least two mounting tools to hold the brake drum against the wheel hub; installing at least one wheel on the wheel hub; securing the at least one wheel to the wheel hub; and removing the at least two mounting tools from the studs of the wheel hub.

2. The method of claim 1, wherein the step of installing the at least two mounting tools on the at least two studs of the wheel hub includes threading the at least two mounting tools on the at least two studs.

3. The method of claim 2, wherein the at least one wheel includes a plurality of wheels.

4. The method of claim 1, wherein the at least one mounting tab includes a plurality of mounting tabs.

5. The method of claim 4, further comprising the step of creating a space between the brake drum and each of the plurality of mounting tabs of the wheel hub when the brake drum is seated in the plurality of mounting tabs.

6. The method of claim 5, wherein one of the spaces located at one side of the brake drum is uniform with another of the spaces located at a second side of the brake drum opposite the first side of the brake drum.

* * * * *

UNITED STATES PATENT AND TRADEMARK OFFICE
CERTIFICATE OF CORRECTION

PATENT NO. : 9,032,600 B2  Page 1 of 1
APPLICATION NO. : 12/618310
DATED : May 19, 2015
INVENTOR(S) : Art Pulphus et al.

It is certified that error appears in the above-identified patent and that said Letters Patent is hereby corrected as shown below:

On The Title Page, Item (57)

In the Abstract, insert --a-- between "has" and "first";

In The Specification

Column 4, line 25, delete "secure" and insert --securely--;

Column 4, line 26, delete "frequent" and insert --frequently--.

Signed and Sealed this
Seventeenth Day of May, 2016

Michelle K. Lee
*Director of the United States Patent and Trademark Office*